US012330629B2

(12) United States Patent
Amano (10) Patent No.: US 12,330,629 B2
(45) Date of Patent: Jun. 17, 2025

(54) VEHICLE DEPARTURE CONTROL METHOD BY REMOTE PARKING (71) Applicant: TOYOTA JIDOSHA KABUSHIKI KAISHA, Toyota (JP)

(72) Inventor: Masaaki Amano, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 210 days.

(21) Appl. No.: 18/130,496

(22) Filed: Apr. 4, 2023

(65) Prior Publication Data

US 2023/0406288 A1 Dec. 21, 2023

(30) Foreign Application Priority Data

Jun. 20, 2022 (JP) ................................ 2022-098547

(51) Int. Cl.
B60W 30/06 (2006.01)
B60W 60/00 (2020.01)
E04H 6/18 (2006.01)
G06V 20/56 (2022.01)

(52) U.S. Cl.
CPC ........ B60W 30/06 (2013.01); B60W 60/0016 (2020.02); E04H 6/18 (2013.01); G06V 20/56 (2022.01); B60W 2420/403 (2013.01); B60W 2556/45 (2020.02)

(58) Field of Classification Search
CPC ......... B60W 2556/45; B60W 60/0016; B60W 20/06
See application file for complete search history.

(56) References Cited

U.S. PATENT DOCUMENTS

| 6,154,685 | A | * | 11/2000 | Kim | .................. | E04H 6/225 |
|---|---|---|---|---|---|---|
| | | | | | | 700/217 |
| 11,279,252 | B1 | * | 3/2022 | Alan | .................. | B60L 53/16 |
| 2018/0298865 | A1 | * | 10/2018 | Tamane | ................ | F02N 11/101 |
| 2019/0286919 | A1 | * | 9/2019 | Viswanath | ............. | G06V 10/44 |
| 2021/0024099 | A1 | * | 1/2021 | Ito | ..................... | G05D 1/0022 |
| 2021/0122362 | A1 | * | 4/2021 | Okamura | ............. | G05D 1/0011 |
| 2021/0253090 | A1 | | 8/2021 | Hayakawa et al. | | |
| 2022/0306090 | A1 | * | 9/2022 | Noguchi | ............. | B60W 30/181 |

FOREIGN PATENT DOCUMENTS

| JP | 2003328577 | A | * | 11/2003 |
|---|---|---|---|---|
| JP | 2006234418 | A | * | 9/2006 |
| JP | 2009154766 | A | * | 7/2009 |
| JP | 2009197470 | A | * | 9/2009 |
| JP | 2012-154669 | A | | 8/2012 |
| JP | 2017-177825 | A | | 10/2017 |
| JP | 2018059378 | A | * | 4/2018 |
| JP | 2019-035209 | A | | 3/2019 |
| JP | 2020-041287 | A | | 3/2020 |
| KR | 20160103208 | A | * | 9/2016 |
| WO | 2019/082388 | A1 | | 5/2019 |

* cited by examiner

Primary Examiner — Justin S Lee
(74) Attorney, Agent, or Firm — Sughrue Mion, PLLC (57) ABSTRACT A vehicle departure control method by remote parking performed by a user operating a terminal device, the step of confirming that the delivery is a delivery from the mechanical multistory parking lot, a step of determining whether the vehicle to be delivered is moved in the mechanical multistory parking lot, when it is determined that the vehicle is moved, or when it is determined that the vehicle is not in the delivery preparation position, including a step of prohibiting the movement of the vehicle by the automatic driving of the remote parking.

1 Claim, 4 Drawing Sheets

VEHICLE DEPARTURE CONTROL METHOD BY REMOTE PARKING

CROSS-REFERENCE TO RELATED APPLICATION

This application claims priority to Japanese Patent Application No. 2022-098547 filed on Jun. 20, 2022, incorporated herein by reference in its entirety.

BACKGROUND

1. Technical Field

The present disclosure relates to a vehicle departure control method by remote parking of a vehicle such as an automobile.

2. Description of Related Art

Remote parking is known in which a terminal device is controlled at a position away from a vehicle such as an automobile to perform arrival control and departure control of the vehicle. The arrival control of the remote parking is performed by moving the vehicle from the arrival start position to the target parking position by autonomous driving, and the departure control of the remote parking is performed by moving the vehicle from the parking position to the target departure position by autonomous driving.

In the remote parking, it is necessary that the distance between the vehicle and the terminal device is within a limit distance so that the arrival control and the departure control can be safely performed. For example, WO 2019/082388 describes a control method of remote parking in which, when the relative altitude of the operator of the terminal device and the vehicle is equal to or greater than a second threshold value and less than a third threshold value, the vehicle is moved by low-speed autonomous driving, and when the relative altitude is equal to or greater than the third threshold value, the movement of the vehicle by autonomous driving is prohibited.

According to the control method of the remote parking described in WO 2019/082388, when the relative altitude of the operator of the terminal device and the vehicle is equal to or greater than the second threshold value and less than the third threshold value, the vehicle is moved by low-speed autonomous driving. Therefore, compared with the case where the vehicle is moved by autonomous driving without the vehicle speed being limited to the low speed, it is possible to increase the margin of the operation when the operator operates the terminal device and to ensure the accuracy of the operation.

Further, when the relative altitude of the operator of the terminal device and the vehicle is large, there is a possibility that the accuracy of the remote operation of the vehicle when the operator operates the terminal device cannot be ensured. According to the control method of the remote parking described in WO 2019/082388, when the relative altitude of the operator of the terminal device and the vehicle is equal to or greater than the third threshold value, the movement of the vehicle by the autonomous driving is prohibited. Therefore, it is possible to reduce the possibility that the vehicle is inappropriately moved based on an inaccurate remote operation by the operator.

SUMMARY

When parking of a vehicle is performed in a mechanical multistory parking lot, movement of the vehicle in the mechanical multistory parking lot is performed by moving a pallet on which the vehicle is placed. Therefore, in the remote parking in the mechanical multistory parking lot, in addition to the control being restricted based on the relative altitude of the operator of the terminal device and the vehicle, the movement of the vehicle must also be restricted so that the movement of the vehicle by the autonomous driving is prevented during the movement of the pallet.

However, at the time of departure from the mechanical multistory parking lot, the operator has to perform a predetermined series of departure operations using the operation panel of the mechanical multistory parking lot, and wait until the vehicle reaches the departure preparation position by the movement of the pallet. Thus, some operators may activate an application for remote parking of the terminal device while waiting after performing a predetermined series of departure operations, so that the vehicle can be remotely operated.

The control method of the remote parking described in the above-mentioned WO 2019/082388 does not take into consideration that the movement of the vehicle by autonomous driving must be restricted during the movement of the pallet at the time of departure from the mechanical multistory parking lot. Therefore, in the case where departure of the vehicle is performed by remote parking in the mechanical multistory parking lot, the operator cannot be suppressed from operating the terminal device before the vehicle arrives at the departure preparation position and from trying to move the vehicle by autonomous driving.

The present disclosure provides a vehicle departure control method that has been improved to keep a vehicle from being moved by autonomous driving until the vehicle reaches a departure preparation position when departure of the vehicle is performed by remote parking in a mechanical multistory parking lot.

A vehicle departure control method by remote parking according to a first aspect of the present disclosure includes: confirming that vehicle departure is vehicle departure from a mechanical multistory parking lot; determining whether a vehicle that is to depart is being moved; and prohibiting the vehicle from moving by autonomous driving of the remote parking when a determination is made that the vehicle is being moved.

According to such a configuration, when it is confirmed that the vehicle departure is the vehicle departure from the mechanical multistory parking lot and when it is determined that the vehicle to depart is being moved, the movement of the vehicle by autonomous driving of the remote parking is prohibited. Accordingly, in a case where the vehicle departs from the mechanical multistory parking lot by the remote parking, when the vehicle is being moved, the vehicle cannot be moved by autonomous driving of the remote parking. Therefore, it is possible to suppress the movement of the vehicle by autonomous driving from being started before the vehicle arrives at the departure preparation position.

The vehicle departure control method by the remote parking according to the first aspect may further include permitting the vehicle to move by autonomous driving of the remote parking when a determination is made that the vehicle is not being moved and that the vehicle is in a departure preparation position.

According to such a configuration, when it is determined that the vehicle is not being moved and it is determined that the vehicle is at the departure preparation position, the movement of the vehicle by autonomous driving of the remote parking is permitted. Therefore, the vehicle can be moved from the departure preparation position to a position outside the mechanical multistory parking lot by autonomous driving by the departure control of the remote parking.

In the vehicle departure control method by the remote parking according to the first aspect, when vibration of the vehicle is not being detected by an acceleration sensor mounted on the vehicle, a determination may be made that the vehicle is not being moved.

In the case where the vehicle is moved in the mechanical multistory parking lot, the vehicle is moved when the pallet on which it is placed is moved. Accordingly, the vehicle is subjected to vibration caused by the movement of the pallet. Therefore, when the vibration of the vehicle is not being detected as the periodic variation of the acceleration of the vehicle by the acceleration sensor mounted on the vehicle, it may be determined that the vehicle is not being moved.

According to such a configuration, when the vibration of the vehicle is not being detected by the acceleration sensor mounted on the vehicle, it is determined that the vehicle is not being moved. Therefore, it is possible to determine that the vehicle is not being moved when the vibration of the vehicle is not being detected by the acceleration sensor without requiring communication with the control device of the mechanical multistory parking lot.

In the vehicle departure control method by the remote parking according to the first aspect, when a scene of a stationary object in the mechanical multistory parking lot does not change, the scene being a scene imaged by a camera sensor mounted on the vehicle, a determination may be made that the vehicle is not being moved.

When the vehicle is moved in the mechanical multistory parking lot, the position of the vehicle relative to the stationary object in the mechanical multistory parking lot changes, and thus the scene of the stationary object in the mechanical multistory parking lot that has been imaged by the camera sensor mounted on the vehicle changes. On the other hand, in a situation where the vehicle is not moved in the mechanical multistory parking lot, since the position of the vehicle relative to the stationary object in the mechanical multistory parking lot does not change, the scene of the stationary object in the mechanical multistory parking lot that has been imaged by the camera sensor does not change.

According to such a configuration, when the scene of the stationary object in the mechanical multistory parking lot that has been imaged by the camera sensor does not change, it is determined that the vehicle is not being moved. Therefore, it can be determined that the vehicle is not being moved because the scene of the stationary object in the mechanical multistory parking lot does not change when the vehicle is not being moved, without requiring communication with the control device of the mechanical multistory parking lot.

In the vehicle departure control method by the remote parking according to the first aspect, when a change in a position of the vehicle relative to a stationary object in the mechanical multistory parking lot is not being detected by a target sensor that is mounted on the vehicle and that detects a target around the vehicle by a reflected wave of an irradiation wave, a determination may be made that the vehicle is not being moved.

When the vehicle is moved in the mechanical multistory parking lot, the position of the vehicle relative to the stationary object in the mechanical multistory parking lot changes, and thus the position of the vehicle relative to the stationary object in the mechanical multistory parking lot that is detected by the target sensor mounted on the vehicle changes. On the other hand, in a situation where the vehicle is not moved in the mechanical multistory parking lot, since the position of the vehicle relative to the stationary object in the mechanical multistory parking lot does not change, the position of the vehicle relative to the stationary object in the mechanical multistory parking lot that is detected by the target sensor does not change.

According to such a configuration, when a change in the position of the vehicle relative to the stationary object in the mechanical multistory parking lot is not being detected by the target sensor mounted on the vehicle, it is determined that the vehicle is not being moved. Therefore, it can be determined that the vehicle is not being moved because the position of the vehicle relative to the stationary object in the mechanical multistory parking lot that is detected by the target sensor does not change when the vehicle is not being moved, without requiring communication with the control device of the mechanical multistory parking lot.

In the vehicle departure control method by the remote parking according to the first aspect, when information indicating that a pallet on which the vehicle is placed is not being moved is acquired through communication with a control device of the mechanical multistory parking lot, a determination may be made that the vehicle is not being moved.

In the case where the vehicle is moved in the mechanical multistory parking lot, the vehicle is moved when the pallet on which it is placed is moved by control of the control device. Therefore, when the pallet is not being moved, it may be determined that the vehicle is not being moved.

According to such a configuration, when information indicating that the pallet on which the vehicle is placed is not being moved is acquired through communication with the control device of the mechanical multistory parking lot, a determination is made that the vehicle is not being moved. Therefore, it is possible to determine that the pallet is not being moved and the vehicle is not being moved when the pallet is not being moved and the vehicle is not being moved, by using communication with the control device of the mechanical multistory parking lot without requiring information from the in-vehicle sensor.

In the vehicle departure control method by the remote parking according to the first aspect, when a determination is made by a satellite positioning device mounted on the vehicle that a height of the vehicle is a height of the departure preparation position and when an elapsed time from a time point when a determination is made that the vehicle is no longer moved is equal to or larger than a reference value, a determination may be made that the vehicle is in the departure preparation position.

In the above aspect, when a determination is made by a satellite positioning device mounted on the vehicle that a height of the vehicle is a height of the departure preparation position and when an elapsed time from a time point when a determination is made that the vehicle is no longer moved is equal to or larger than a reference value, a determination is made that the vehicle is in the departure preparation position.

Therefore, it is possible to determine that the vehicle is in the departure preparation position when the vehicle is in the departure preparation position, by using the satellite positioning device mounted on the vehicle without requiring communication with the control device of the mechanical multistory parking lot.

In the vehicle departure control method by the remote parking according to the first aspect, when information indicating that a pallet on which the vehicle is placed is positioned at the departure preparation position is acquired through communication with a control device of the mechanical multistory parking lot, a determination may be made that the vehicle is at the departure preparation position.

In the case where the vehicle is moved to the departure preparation position in the mechanical multistory parking lot, the vehicle is moved when the pallet on which it is placed is moved to the departure preparation position by control of the control device. Therefore, when the pallet is located at the departure preparation position, it may be determined that the vehicle is in the departure preparation position.

According to such a configuration, when information indicating that a pallet on which the vehicle is placed is positioned at the departure preparation position is acquired through communication with a control device of the mechanical multistory parking lot, a determination is made that the vehicle is at the departure preparation position. Therefore, it is possible to determine that the vehicle is in the departure preparation position when the vehicle is in the departure preparation position, by using communication with the control device of the mechanical multistory parking lot.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the symbol attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle departure control method by remote parking control according to an embodiment of the present disclosure will be described in detail with reference to the drawings.

Figure 1:
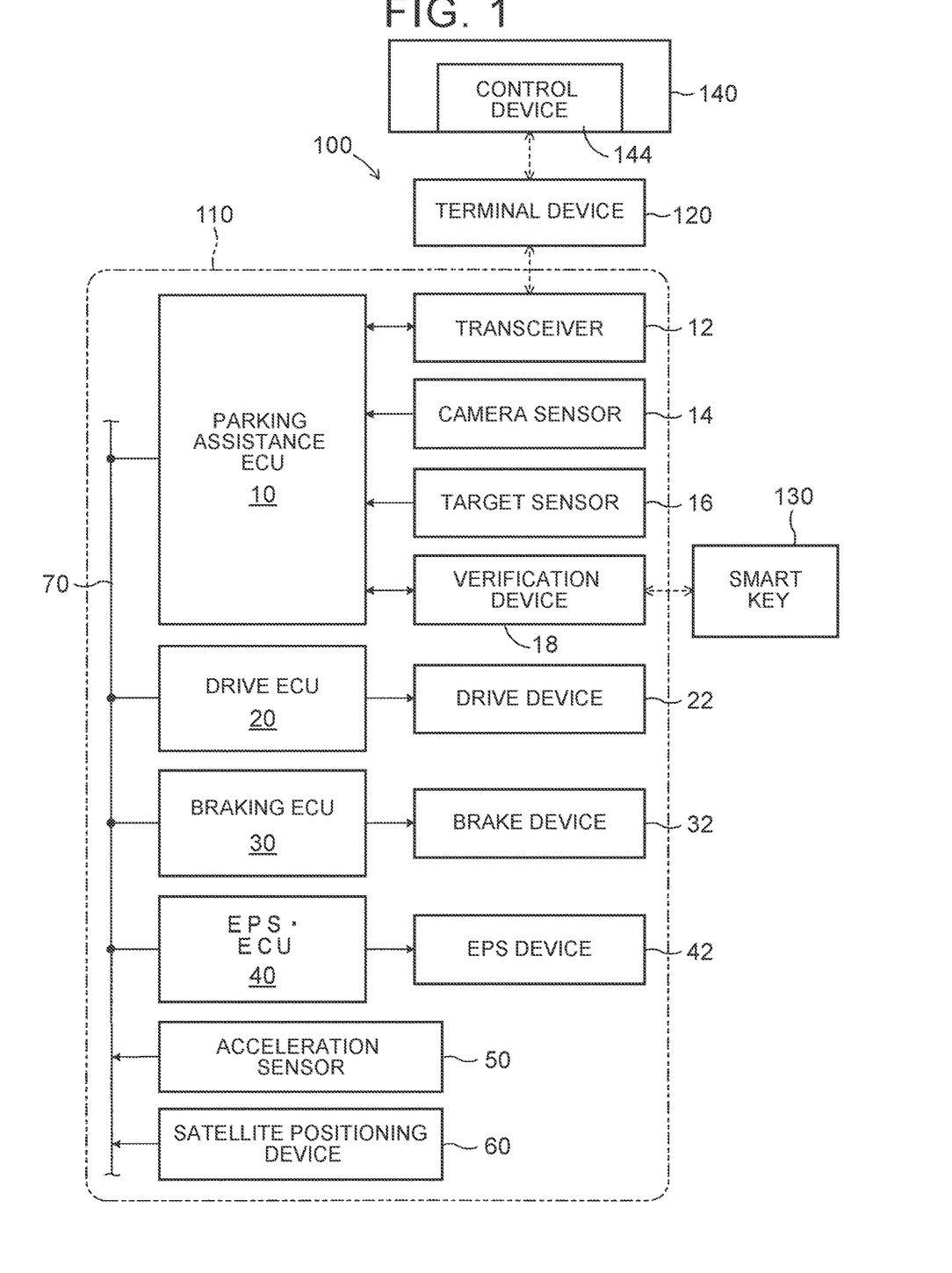
FIG. 1 is a diagram illustrating a vehicle and a mechanical multi-story parking lot to which a vehicle departure control method by remote parking according to an embodiment of the present disclosure is applied.

The remote parking control is performed by the remote parking device 100. The remote parking device 100 includes a parking assistance ECU 10 mounted on the vehicle 110 and a terminal device 120 that cooperates with ECU 10. As shown in FIG. 1, the vehicle 110 includes a driving ECU 20, a braking ECU 30, and an electric power steering ECU 40 in addition to the parking assistance ECU 10. Further, although not shown in FIG. 1, the vehicle 110 includes an acceleration sensor 50 and a satellite positioning device 60. The electric power steering ECU is referred to as Electric Power Steering ECU (EPS ECU).

The respective ECU are Electronic Control Unit including a microcomputer as a main part, and are connected to each other via a Controller Area Network (CAN) 70 so as to be able to transmit and receive data. The microcomputer includes a CPU, ROM, RAM, a non-volatile memory, an interface, and the like. The CPU realizes various functions by executing instructions (programs, routines) stored in the ROM. Some or all of these ECUs may be integrated into one ECU.

The parking assistance ECU 10 is a central control device that performs remote parking control, and executes traveling control of the vehicle, such as autonomous driving control for causing the vehicle to travel without requiring driving of a driver. A transceiver 12, a camera sensor 14, a target sensor 16, and a verification device 18 that wirelessly communicate with the terminal device 120 are connected to the parking assistance ECU 10. Note that the terminal device 120 may be, for example, a smart phone that wirelessly communicates with the transceiver 12 by Bluetooth (registered trademark).

The camera sensor 14 includes four camera units that capture images of the front, rear, left, and right sides of the vehicle 110, and a recognition unit that analyzes image data obtained by capturing images by the camera unit and recognizes stationary objects of other vehicles, roads, and parking lots. The camera unit of the camera sensor 14 captures a landscape around the host vehicle. The recognition unit of the camera sensor 14 supplies information such as information on the recognized other vehicle, information on the white line, information on the stationary object in the parking lot, and information on the relative positional relation of the own vehicle with respect to the stationary object in the parking lot to the parking lot to the parking assist ECU 10 at predetermined intervals.

The target sensor 16 includes a plurality of radar sensors that detect target information around the vehicle 110, and each radar sensor includes a radar transceiver and a signal processor (not shown). The radar transceiver radiates a millimeter wave (hereinafter referred to as "millimeter wave") and receives a millimeter wave (that is, a reflected wave) reflected by a target object (for example, another vehicle, a bicycle, a guardrail, or the like) present in the radiation range. Based on the phase difference between the transmitted millimeter wave and the received reflected wave, the attenuation level of the reflected wave, the time from the transmission of the millimeter wave until the reception of the reflected wave, and the like, the signal processor supplies target information indicating the distance between the host vehicle and the target, the relative speed of the host vehicle and the target, the relative position (direction) of the target with respect to the host vehicle, and the like to the parking assist ECU 10 at predetermined time intervals.

Instead of the radar sensor, Light Detection And Ranging (LiDAR) may be used. Further, the target sensor 16 may be any sensor that emits a radiation wave and detects target information by detecting the reflected wave, and may be, for example, a sonar that uses an ultrasonic wave as a radiation wave or a laser sensor that uses a laser beam as a radiation wave.

The verification device 18 is paired with the smart key 130, and realizes a so-called smart entry by wirelessly communicating with the smart key by, for example, Bluetooth (registered trademark). The smart key 130 may be replaced with a keyless key paired with the verification device 18.

Although not shown in FIG. 1, a setting operation device is further connected to the parking assistance ECU 10. The setting operation device is an operation device including a plurality of switches for setting whether or not to perform autonomous driving and remote parking. The setting operation device includes a switch for remote parking, and the parking assistance control ECU 10 cooperates with the terminal device 120 to perform entry control and exit control for remote parking when the switch for remote parking is on.

The driving ECU 20 is connected with a drive device 22 that accelerates the vehicles 110 by applying a driving force to driving wheels not shown in FIG. 1. In a normal state, the drive ECU 20 controls the drive device so that the driving force generated by the drive device 22 changes in response to a driving operation by the driver, and when a command signal is received from the parking assist ECU 10, controls the drive device 22 based on the command signal.

The drive device 22 may be a combination of an internal combustion engine and a transmission. The present disclosure may be applied to a so-called hybrid electric vehicle (HEV including an internal combustion engine and a motor as a driving force source, or to a so-called electric vehicle (EV) including only a motor as a driving force source without including an internal combustion engine. In addition, the present disclosure may be applied to a so-called plug-in hybrid electric vehicle (PHEV that runs using power outputted from at least one of the first motor generator and the second motor generator as a driving force and can charge a battery from an external power source). Further, the present disclosure may be applied to a so-called fuel cell electric vehicle (FCEV in which a motor is driven by electric power generated by a fuel-cell, or a so-called in-wheel motor-type vehicle in which a motor is incorporated in each wheel and each wheel is driven by a corresponding motor.

A braking device 32 is connected to the braking ECU 30 to decelerate the vehicles 110 by braking by applying braking force to wheels not shown in FIG. 1. In a normal state, the braking ECU 30 controls the braking device so that the braking force generated by the braking device 32 changes in accordance with the braking operation by the driver, and when a command signal is received from the parking assist ECU 10, automatically braking is performed by controlling the braking device 32 based on the command signal.

An EPS device 42 is connected to EPS ECU 40. EPS ECU 40 controls the steering assist torque by controlling EPS device 42 on the basis of the steering torque and the vehicle speed detected by the steering torque sensor and the vehicle speed sensor, which are not shown in FIG. 1, respectively, to reduce the steering burden on the driver. EPS ECU 40 can steer the steered wheels as needed by controlling EPS device 42. Thus, EPS ECU 40 and EPS device 42 functions as a steering device that automatically steers steered wheels as needed.

The parking assist ECU 10 controls the braking and driving force of the vehicle 110 by outputting a command signal to the driving ECU 20 and the braking ECU 30, and automatically steers the steered wheels by outputting a command signal to EPS ECU 40, whereby autonomous driving can be performed. In particular, the parking assistance ECU 10 cooperates with the terminal device 120 to move the vehicle by autonomous driving so that the vehicle 110 moves to the target delivery position along the target route of delivery by the remote parking during the delivery control of the remote parking.

In the embodiment, the acceleration sensor 50 and the satellite-positioning device 60 are connected to a CAN 70. The acceleration sensor 50 includes a vertical acceleration sensor that detects vertical acceleration, longitudinal acceleration, and lateral acceleration of the vehicle 110, a longitudinal acceleration sensor, and a lateral acceleration sensor, respectively, but any of the acceleration sensors may be omitted.

The satellite positioning device 60 is one of the satellite positioning apparatuses, receives radio waves emitted by the positioning satellites, and sequentially measures a current position (specifically, longitude and latitude) of the vehicle 110 based on the received radio waves. Then, the satellite positioning device 60 sequentially transmits the measured present position of the vehicle 110 to the parking assistance ECU 10. Note that the satellite positioning device 60 may be a Global Navigation Satellite System (GNSS) device or a Global Positioning System (GPS) device.

Although not shown in FIG. 1, CAN 70 is further connected with a meter ECU, and the meter ECU is connected with an indicator for displaying a state of control by the parking assist ECU 10 and the like. The display may be, for example, a head-up display or a multi-information display in which a meter and various kinds of information are displayed, or may be a display of a navigation device.

Figure 2:
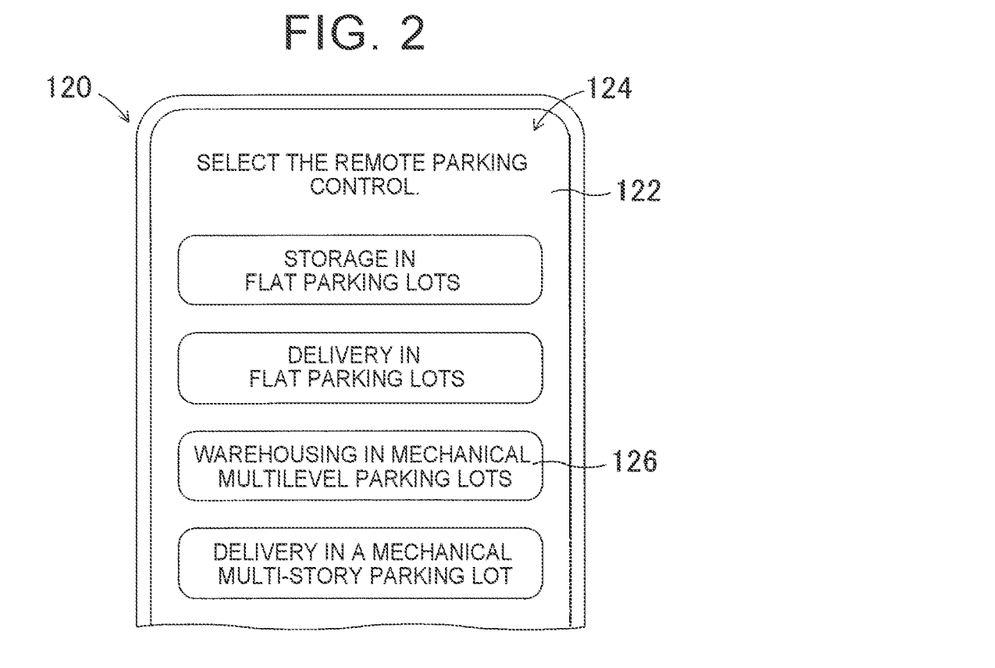
FIG. 2 is a diagram illustrating a soft touch button image for selecting control of remote parking displayed on a display of a terminal device.

As shown in FIG. 2, the terminal device 120 includes a touch panel type display 122 and includes a terminal radio transceiver, a GPS receiver, and a terminal ECU not shown in FIG. 2. The display 122 is connected to the terminal ECU and is controlled by the terminal ECU to display various images. The user can also use the display 122 to make necessary instructions regarding parking. The terminal radio transceiver is connected to the terminal ECU and wirelessly transmits various signals transmitted by the terminal ECU. GPS receiver receives a GPS for detecting the present position of the terminal device 120. Further, the terminal wireless transceiver receives various types of signals wirelessly transmitted by the parking assistance ECU 10 of the vehicles 110 via the transceiver 12 and transmits the received signals to the terminal ECU.

The terminal ECU includes a microcomputer as a main part, and the microcomputer includes a CPU, ROM, RAM, a non-volatile memory, an interface, and the like. The CPU realizes various functions by executing instructions (programs, routines) stored in the ROM. A remote parking application for performing remote parking control in cooperation with the parking assistance ECU 100 is installed in ROM.

The remote parking application is abbreviated as "remote parking application". The user who operates the terminal device 120 may not be the driver, and the terminal device 120 may not be the terminal device of the driver.

The driving assistance control ECU 10 and the terminal device 120 transmit and receive data to and from each other via the transceiver 12 when the remote parking application of the terminal device 120 is activated. Further, the driving assistance control ECU 10 and the terminal device 120, at the time of retrieval, the remote parking application of the terminal device 120 is activated, the power of the vehicle 110 is turned on by the operation of the terminal device, by the switch of the remote parking of the setting operation device is turned on, and exchanges information with each other via the transceiver 12.

In particular, when the delivery is to be delivered from the mechanical multistory parking lot, the vehicle to be delivered placed on the pallet is moved from the parking position to the delivery preparation position in the multistory parking lot, the pallet is moved to the delivery preparation position in a state of being loaded on the pallet. When the vehicle is moved to the delivery preparation position, the vehicle is moved to the delivery completion position outside the multi-story parking lot by the automatic driving by the remote parking control. Therefore, even if the remote parking application of the terminal device 120 is activated before the vehicle is moved to the delivery preparation position, the vehicle must be prohibited from being moved by the automatic driving by the remote parking control until the movement of the vehicle to the delivery preparation position is completed.

Figure 3:
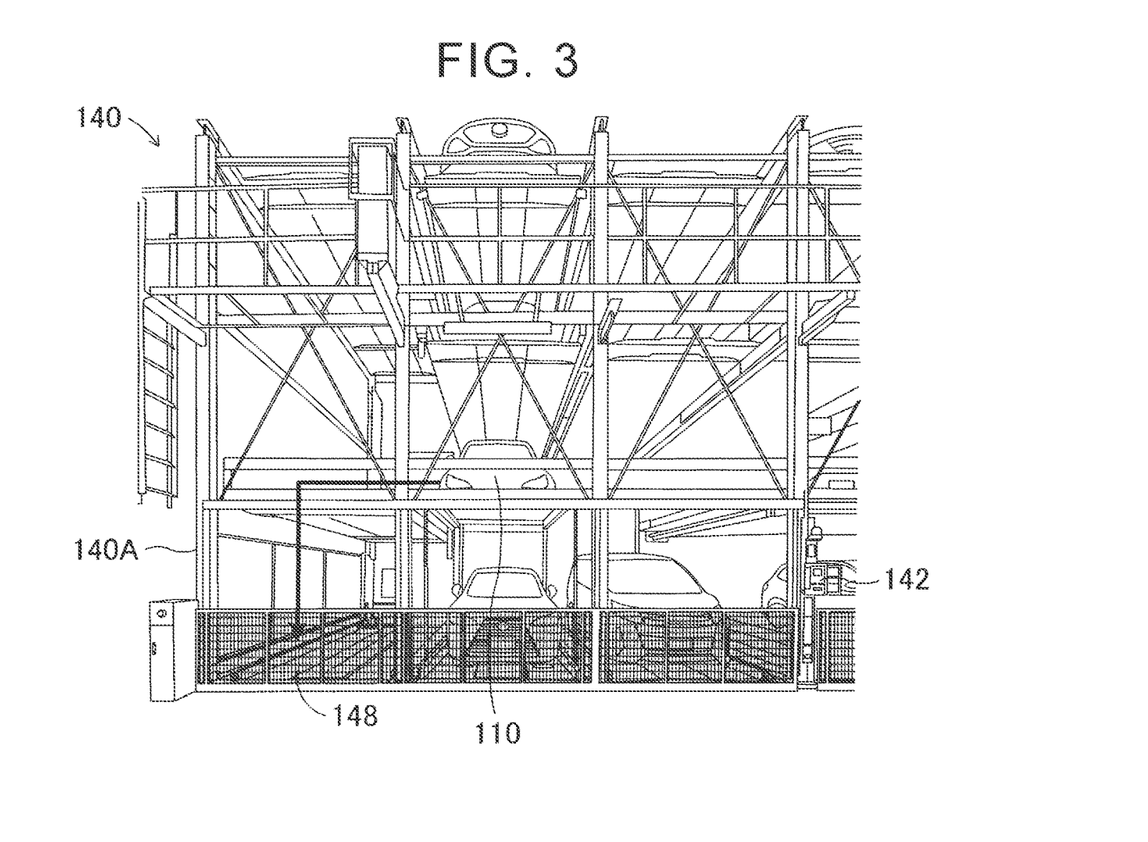
FIG. 3 is an external view showing an example of an elevating and traversing type mechanical multilevel parking lot.

For example, FIG. 3 is an external view showing an example of an elevating and traversing type mechanical multistory parking lot 140 having a plurality of parking spaces on each floor from the first floor to the fourth floor. The vehicle 110 to be unloaded is parked in the second parking compartment from the left of the second floor, taking a case where there is no vehicle parked in the parking compartment at the left end of the first floor and the second floor as an example, a procedure of unloading will be described.

Although not shown in FIG. 3, operations such as the movement of the pallet for loading and unloading of the vehicle are controlled by a control device 144 (see FIG. 1) built in the control panel 142 of the mechanical multistory parking lot 140.

Figure 4:
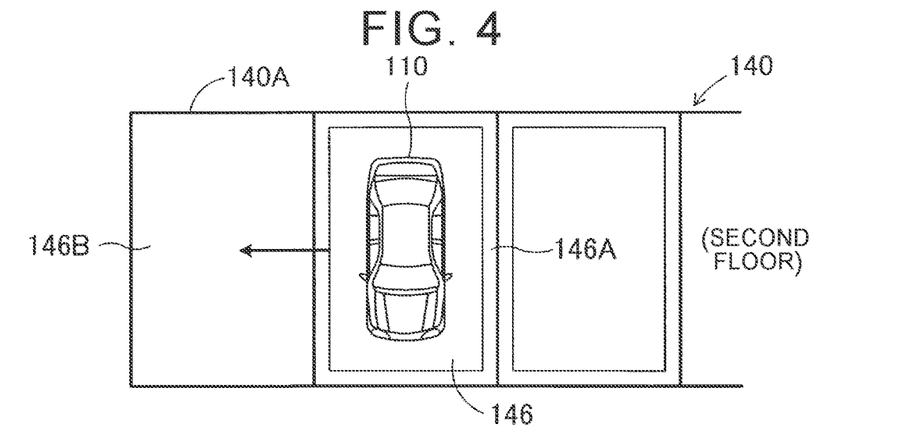
FIG. 4 is a diagrammatic plan cross-sectional view of a second floor of a mechanical parking lot showing a vehicle parked in a mechanical parking lot.
Figure 5:
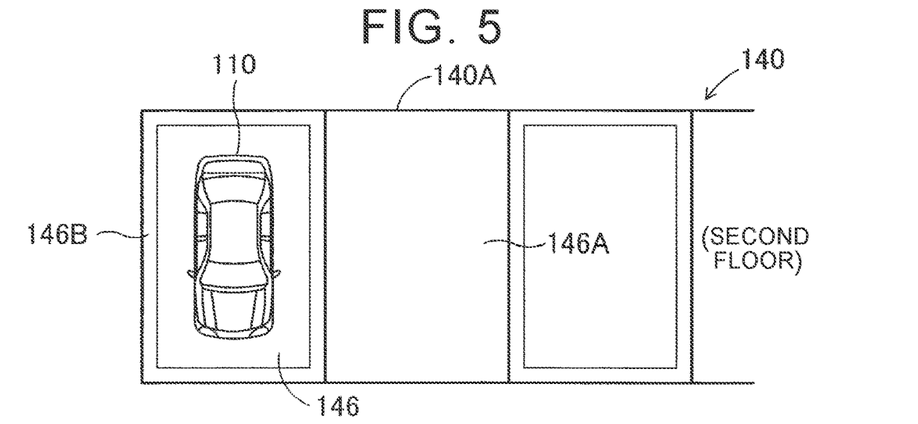
FIG. 5 is a diagrammatic plan cross-sectional view of a second floor of a mechanical parking lot showing a vehicle moved laterally in a mechanical parking lot.
Figure 6:
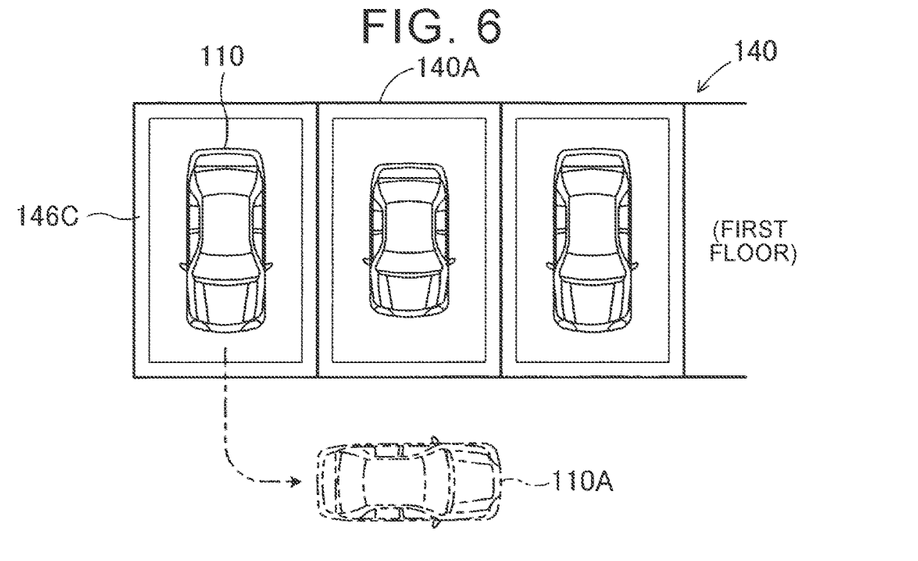
FIG. 6 is a diagrammatic plan cross-sectional view of a first floor of a mechanical parking lot showing a vehicle moved to a delivery preparation position in the mechanical parking lot.

The user of the terminal device 120 opens the door of the control panel 142 of the mechanical multi-story parking lot 140, inserts a key and rotates, thereby turning on the power of the control device 144. The user inputs a reference code number for specifying the vehicle 110 using the numeric keypad of the control panel 142, confirms safety, and presses an exit button. As shown in FIGS. 4 and 5, the pallet 146 on which the vehicle 110 is placed is horizontally laterally moved from the left second parking compartment 146A of the second floor to the left end of the parking compartment 146B of the second floor by the control device 144. Then, as shown in FIG. 6, the pallet 146 is moved vertically downward to the position of the parking compartment 146C at the left end of the first floor, that is, to the unloading preparation position.

The user activates the remote parking application of the terminal device 120 after pressing the delivery button. The user selects "exit in a mechanical multistory parking lot" on the control selection screen 124 (see FIG. 2) displayed on the display 122 of the terminal device 120, and turns on the power of the vehicle 110. The user confirms that the vehicle 110 has moved to the unloading preparation position and the gate 148 has been raised and opened, and after confirming the safety of the surroundings, operates the terminal device 120 to set the target unloading position 110A in front of the mechanical multistory parking lot 140.

The user moves the vehicles 110 from the unloading preparation position 146C to the target unloading position 110A by autonomous driving by remote control. Further, the user confirms the safety and pushes the delivery completion button of the control panel 142, in response to the gate 148 is closed by the control device 144, by confirming it and rotating the key, the control device 144 is turned off, closing the door of the control panel 142. Note that a smart key may be used instead of the key.

Remote Parking Control Routine

Figure 7:
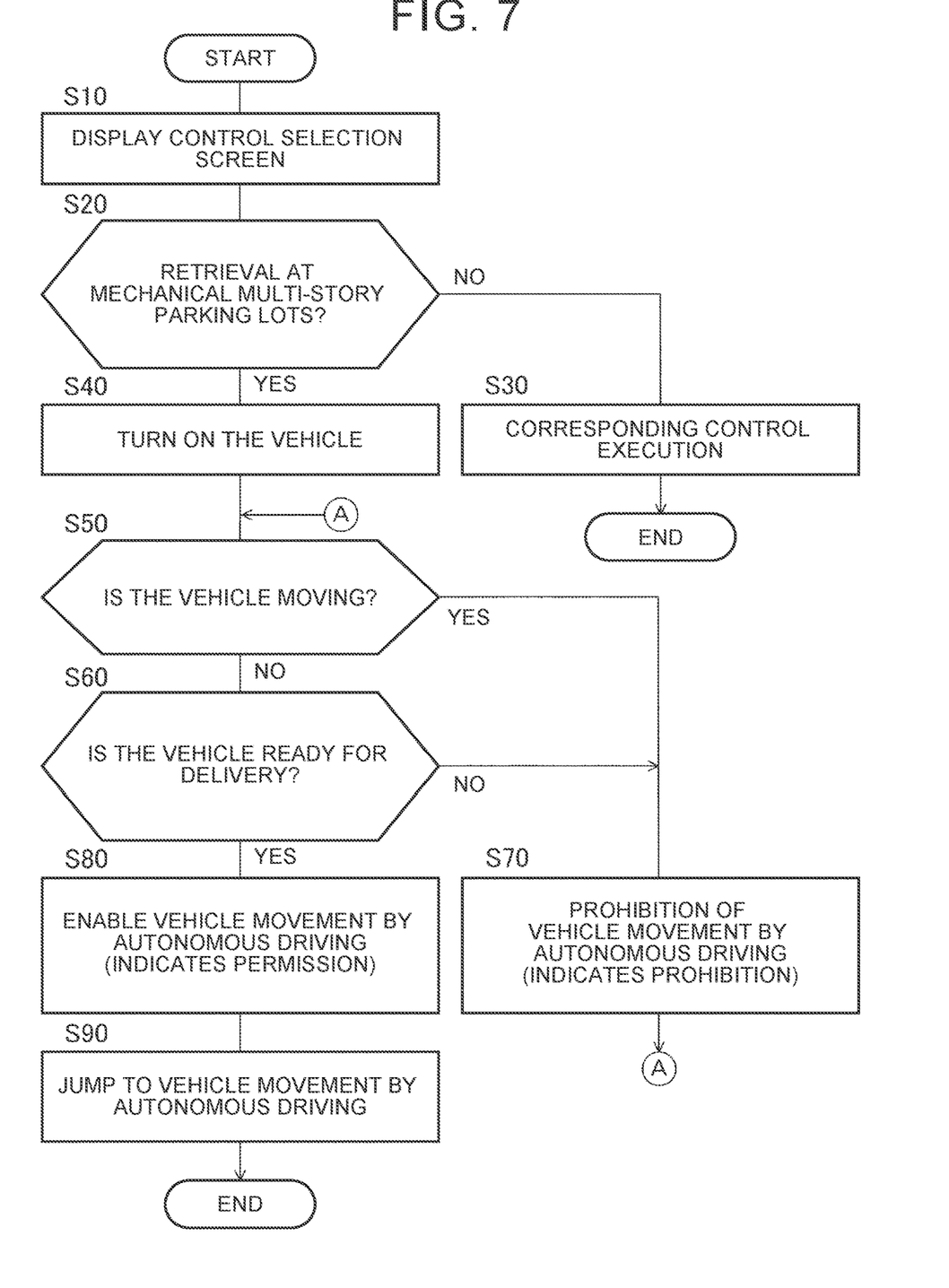
FIG. 7 is a flow chart showing a remote parking delivery control routine in the embodiment.

In the embodiment, the control of the remote parking according to the flow chart shown in FIG. 7 is repeatedly executed by CPU of the terminal ECU at a predetermined control cycle in cooperation with the parking assistance ECU 10 or the like. The embodiment of the vehicle departure control method of the present disclosure is executed by executing the control of the remote parking in accordance with the flowchart shown in FIG. 7. In the following description, the control of the remote parking is simply referred to as "main control".

First, in the step-wise S10, CPU displays a soft touch button image 124 for selecting the control by the remote parking control on the display 122 of the terminal device 120. As shown in FIG. 2, the image includes soft touch buttons 126 for "arrival at a flat parking lot", "departure at a flat parking lot", "arrival at a mechanical multi-story parking lot", and "departure at a mechanical multi-story parking lot".

In S20 of steps, CPU determines whether or not "exit in a mechanical multi-story parking lot" has been selected. When an affirmative determination is made, CPU advances the present control to step S40, and when a negative determination is made, advances the present control to step S30.

In S30 of steps, CPU performs control corresponding to the control selected by the touch of the soft touch button (control other than "dispatch in the mechanical parking lot") in a manner known in the art.

In S40 of steps, CPU powers on the vehicles 110 by communicating with the driving assistance control ECU 10. As a result, the camera sensor 14, the target sensor 16, and the like operate.

In a S50 of steps, CPU determines whether the vehicles 110 have been moved within the mechanical multistory parking lot 140. When an affirmative determination is made, CPU advances the present control to step S70, and when a negative determination is made, advances the present control to step S60.

In this step, if the terminal device 120 is unable to communicate with the control device 144 of the mechanical multi-story parking lot 140, it may be determined that the vehicle 110 is moving in the mechanical multi-story parking lot 140 when any of the conditions A1 to A4 below is satisfied. In other words, it may be determined that the vehicles 110 have not been moved within the mechanical multi-story parking lot 140 when all of the conditions A1 to A4 below have not been satisfied.

A1: At least one of the vertical acceleration sensor, the front-rear acceleration sensor, and the lateral acceleration sensor of the acceleration sensor 50 detects a variation in acceleration, that is, a vibration of the vehicle at a frequency higher than the acceleration at which the vehicle 110 is self-propelled.

A2: The position of a stationary object (for example, a frame 140A) in the mechanical multistory parking lot 140 captured by the camera sensor 14 is changed in the images.

A3: The position of the stationary object of the mechanical multistory parking lot 140 detected by the target sensor 16 with respect to the vehicle 110 is changed.

A4: The position of the vehicle 110 detected by the satellite positioning device 60 is changed.

Further, when the terminal device 120 is paired with the control device 144 of the mechanical multistory parking lot 140 and can communicate with the control device 144 as shown in FIG. 1, it may be determined that the vehicle 110 is moving in the mechanical multistory parking lot 140 when the following condition B1 is satisfied. In other words, when the condition B1 below is not satisfied, it may be determined that the vehicles 110 have not been moved in the mechanical multistory parking lot 140.

B1: The control device 144 supplies information indicating that the pallet 146 on which the vehicles 110 are placed is moving toward the unloading preparation position (parking compartment 146C).

In S60 of steps, CPU determines whether or not the vehicles 110 are in the delivery ready position 146C. When an affirmative determination is made, CPU advances the present control to step S80, and when a negative determination is made, advances the present control to step S70.

In this step, if the terminal device 120 is unable to communicate with the control device 144 of the mechanical multistory parking lot 140, it may be determined that the vehicle 110 is in the delivery ready position when all of the conditions C1 to C4 below are satisfied.

C1: The elapsed time Te1 from when none of the vertical acceleration sensor, the longitudinal acceleration sensor, and the lateral acceleration sensor of the acceleration sensor 50 detects the vibration of the vehicle is equal to or greater than the first reference time Tec1 (positive constant).

C2: The elapsed time Te2 after the position of the stationary object in the mechanical multistory parking lot 140 captured by the camera sensor 14 is not changed in the images is equal to or greater than the second reference time Tec2 (positive constant).

C3: The elapsed time Te3 from when the position of the stationary object in the mechanical multistory parking lot 140 detected by the target sensor 16 with respect to the vehicle 110 does not change is equal to or greater than the third reference time Tec3 (positive constant).

C4: The height of the vehicle of the vehicle 110 detected by the satellite positioning device 60 is the height of the delivery preparation position 146C.

In addition, when the terminal device 120 can communicate with the control device 144 of the mechanical multistory parking lot 140, it may be determined that the vehicles 110 are in the delivery ready position when the following condition D1 is satisfied.

D1: The control device 144 supplies information indicating that the pallet 146 on which the vehicles 110 are placed is located at the unloading preparation position.

In the stepping S70, CPU prohibits the vehicle 110 from moving by autonomous driving, and displays the content (e.g., "Cannot move the vehicle. Please wait a moment.") on the display 122 of the terminal device 120. Therefore, even if the user attempts to move the vehicle 110 by autonomous driving, the vehicle cannot be moved. When the step S70 is completed, CPU advances the present control to step S50.

In the stepping S80, CPU allows the vehicle 110 to be moved out of storage by autonomous driving, and displays the content (e.g., "The vehicle can be moved.") on the display 122 of the termipnal device 120. Therefore, if the user tries to move the vehicle 110 out of the mechanical multistory parking lot 140 by automatic driving, the user can move the vehicle.

In step S90, CPU causes the control to jump to the step of moving the vehicle by autonomous driving. Therefore, the user can set the target delivery position outside the mechanical multistory parking lot 140 by operating the terminal device 120, and move the vehicle 110 to the target delivery position by automatic driving. Movement of the vehicle by autonomous driving may be performed in any manner known in the art.

As can be seen from the above explanation, according to the embodiment, the control after the step S40 is executed in a situation (step S20) where the user is trying to unload the vehicles 110 in the mechanical multi-story parking lot. When it is determined that the vehicle 110 is being moved in the mechanical multi-story parking lot 140 (step S50) or when it is determined that the vehicle 110 is not positioned at the delivery ready position (step S60), the vehicle 110 is prohibited from being moved by autonomous driving (step S70).

Therefore, when the vehicle is discharged from the mechanical multilevel parking lot by the remote parking, the vehicle cannot be moved by the automatic driving of the remote parking in a situation in which the vehicle is moved and in a situation in which the vehicle is not positioned at the discharge preparation position. Therefore, it is possible to suppress the movement of the vehicle by the automatic driving from being started before the vehicle arrives at the delivery preparation position.

Further, according to the embodiment, when it is determined that the vehicle has not been moved (step S50) and it is determined that the vehicle is in the delivery ready position (step S60), the vehicle is permitted to move by autonomous driving of the remote parking (step S80). Therefore, the vehicle can be moved from the delivery preparation position to the position outside the mechanical multistory parking lot by the automatic driving by the delivery control by the remote parking.

Since the vehicle is moved in a state of being placed on the pallet, the vehicle is subjected to vibration caused by the movement of the pallet. Therefore, when the acceleration sensor 50 mounted on the vehicle 110 does not detect the vibration of the vehicle as the periodic variation of the acceleration of the vehicle, it may be determined that the vehicle 110 is not moved.

Further, when the vehicle is moved in the mechanical multi-story parking lot 140, the position of the vehicle relative to the stationary object in the mechanical multi-story parking lot changes. Therefore, when the landscape of the stationary object in the mechanical multistory parking lot captured by the camera sensor 14 is not changed, it may be determined that the vehicle is not moved. Similarly, it may be determined that the vehicle has not been moved even when the position of the vehicle with respect to the stationary object of the mechanical multistory parking lot detected by the target sensor 16 has not changed. Further, when the vehicle is moved in the mechanical multi-story parking lot, the position of the vehicle detected by the satellite positioning device 60 changes.

According to the embodiment, it is determined that the vehicles 110 are not moved in the mechanical multi-story parking lot 140 when all of the conditions A1 to A4 are not satisfied (step S50). Therefore, when any of the above-described conditions A1 to A4 is not satisfied, it is possible to accurately determine that the vehicle has not been moved as compared to when it is determined that the vehicle 110 has not been moved in the mechanical multistory parking lot 140. In addition, it is possible to determine that the vehicle is not moving without requiring communication with the control device 144 of the mechanical multistory parking lot 140.

Further, according to the embodiment, when the terminal device 120 can communicate with the control device 144 of the mechanical multistory parking lot 140, it is determined that the vehicles 110 are not moved in the mechanical multistory parking lot 140 when the condition B1 is not satisfied. Therefore, when the pallet is not moved and the vehicle is not moved, it is possible to accurately determine that the vehicle is not moved by using communication with the control device 144 without requiring information from an in-vehicle sensor.

Further, in a situation where the height of the vehicle 110 detected by the satellite positioning device 60 is the height of the delivery preparation position 146C, when it is determined that the vehicle 110 has not been moved based on the detection results by the acceleration sensor 50, the camera sensor 14, and the target sensor 16, the vehicle 110 may be determined to be in the delivery preparation position.

According to the embodiment, when all of the conditions C1 to C4 are satisfied, it is determined that the vehicles 110 are in the delivery ready position. Therefore, when any of the above-described conditions C1 to C4 is satisfied, it is possible to accurately determine that the vehicle is in the delivery preparation position as compared with a case where it is determined that the vehicle 110 is in the delivery preparation position and a case where the above-described condition C4 is omitted. In addition, it is possible to determine that the vehicle is in the delivery preparation position without requiring communication with the control device 144 of the mechanical multistory parking lot 140.

Further, according to the embodiment, when the terminal device 120 is able to communicate with the control device 144 of the mechanical multistory parking lot 140, it is determined that the vehicle 110 is in the delivery ready position when the condition D1 is satisfied. Thus, when the vehicle is in the delivery preparation position, communication with the control device 144 can be used to accurately determine that the vehicle is in the delivery preparation position.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, in the step S50, it is determined that the vehicles 110 have not been moved in the mechanical multistory parking lot 140 since all of the above-described condition A1 to A4 have not been satisfied. However, at least one of the above-described conditions A1 to A4, for example, the condition A4 may be omitted.

Further, in the above-described embodiment, when the terminal device 120 can communicate with the control device 144 of the mechanical multistory parking lot 140, it is determined that the vehicles 110 are moving in the mechanical multistory parking lot 140 when the above-described condition B1 is satisfied. However, when at least one of the above-described conditions A1 to A4 is satisfied in addition to the above-described condition B1, it may be determined that the vehicles 110 are moving in the mechanical multistory parking lot 140.

Further, in the above-described embodiment, in the step S60, when all of the conditions C1 to C4 are satisfied, it is determined that the vehicles 110 are in the delivery ready position. However, when at least one of the above-described conditions C1 to C3 and the condition C4 are satisfied, it may be determined that the vehicles 110 are in the delivery ready position.

Further, in the above-described embodiment, when the terminal device 120 can communicate with the control device 144 of the mechanical multistory parking lot 140, when the above-described condition D1 is satisfied, it is determined that the vehicle 110 is in the delivery ready position. However, when at least one of the above-described conditions A1 to A3 is satisfied in addition to the above-described condition D1, it may be determined that the vehicles 110 are in the delivery ready position.

Further, in the above-described embodiment, when an affirmative determination is made in the step S50 or a negative determination is made in the step S50 and S60, the moving of the vehicles 110 by autonomous driving is prohibited in the step S70. That is, when it is determined that the vehicle 110 is being moved in the mechanical multistory parking lot 140 or when it is determined that the vehicle 110 is not in the delivery ready position 146C, the vehicle 110 is prohibited from being moved by autonomous driving. However, when the determination of S50 of steps is omitted and it is determined that the vehicle 110 is not in the delivery ready position 146C, the vehicle 110 may be prohibited from moving by autonomous driving.

Further, in the above-described embodiment, the mechanical multi-story parking lot 140 is an elevating and traversing type mechanical multi-story parking lot, but may be, for example, a vertical circulation type mechanical multi-story parking lot, an elevator type mechanical multi-story parking lot, or the like as long as the vehicle is placed on a pallet and moved.

What is claimed is:

1. A vehicle departure control method by remote parking, the vehicle departure control method comprising:
    confirming that vehicle departure is vehicle departure from a mechanical multistory parking lot;
    determining whether a vehicle that is to depart is being moved;
    prohibiting the vehicle from moving by autonomous driving of the remote parking in response to determining that the vehicle is being moved; and
    permitting the vehicle to move by autonomous driving of the remote parking in response to determining that the vehicle is not being moved and that the vehicle is in a departure preparation position, wherein
    when a satellite positioning device mounted on the vehicle determines that a height of the vehicle is a height of the departure preparation position and when an elapsed time from a time point of determining that the vehicle is no longer moved is equal to or larger than a reference value, the vehicle is determined to be in the departure preparation position.

* * * * *